United States Patent Office 3,346,527
Patented Oct. 10, 1967

3,346,527
METAL COMPLEX-FORMING COMPOUNDS AND PROCESS OF MAKING AND USING SAME
Paul Lagally, State College, Pa., assignor to Chemirad Corporation, East Brunswick, N.J., a corporation of Delaware
No Drawing. Filed Dec. 23, 1963, Ser. No. 332,887
12 Claims. (Cl. 260—29.2)

The present invention relates to new and valuable metal complex compounds, and more particualrly to metal complex compounds of polyalkylene imines and their derivatives, to a method of producing such compounds, to compositions containing such compounds, and to their use.

It is one object of the present invention to provide new and valuable reaction products of polyalkylene imines and cyclic organic carbonates and sulfites which may be used in industry for many purposes.

Another object of the present invention is to provide a simple and effective process of producing such reaction products of polyalkylene imines and cyclic organic carbonates and sulfites.

A further object of the present invention is to produce solutions of metal complex compounds of polyalkylene imines and their reaction products with cyclic organic carbonates and sulfites which are useful for many purposes in industry.

Still another object of the present invention is to provide sequestering and metal complex compounds-forming compositions containing polyalkylene imines or their reaction products with cyclic organic carbonates and sulfites which composition find application in many fields of industry.

Still another object of the present invention is to provide a method of maintaining metal ions in solution under conditions under which ordinarily they would be precipitated, for instance, in the form of oxides, hydroxides, carbonates, or other insoluble compounds.

Other objects of the present invention and advantageous features thereof will become apparent as the description proceeds.

It has been found that solutions of polyethylene imines are capable of preventing precipitation of oxides, hydroxides, carbonates or other insoluble salts and compounds of metals. For instance, when adding a solution of ferrous sulfate to an aqueous solution of polyethylene imine, the precipitate first formed redissolves immediately and yields a yellow solution which gradually becomes greyish-green. This solution remains stable when access of air is excluded. However, exposure to air causes precipitation of ferric hydroxide due to oxidation of the iron. In a similar manner it is possible to prevent precipitation of manganous chloride, or of cobaltous chloride, of copper sulfate, and other metal salt solutions by the addition of polyethylene imine solutions. This is quite surprising in view of the alkaline reaction of such polyethylene imine solutions because it is known that the corresponding hydroxides are precipitated when adding solutions of alkali metal hydroxides of aproximately the same pH-value to metal salt solutions.

In place of polyethylene imine, there may be employed the C-substituted polyalkylene imines such as polypropylene imine, polybutylene imine, poly-1,2-dimethyl ehylene imine, polyphenyl ethylene imine, polycyclohexyl ethylene imine and other C-substituted alkyl, cycloalkyl, aryl, and aralkyl polyethylene imine.

Derivatives of such polyalkylene imines have also proved to be useful as metal complex-forming agents. Especially suitable derivatives are, for instance, the reaction products of polyalkylene imines with cyclic esters of polyalcohols, especially with glycol and glycerol esters of carbonic acid, such as ethylene carbonate, propylene carbonate, glycerol carbonate (glycidol), and others. Reaction products of this type are obtained according to the following equation illustrating the reaction of polyethylene imine and ethylene carbonate:

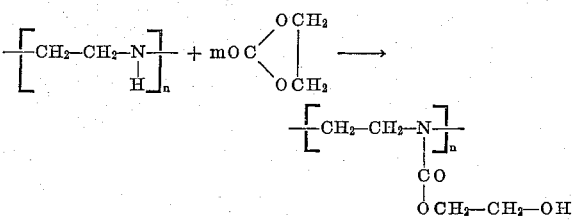

In these formulas $n$ indicates the degree of polymerization, preferably between about 800 and about 3000. Best results are obtained with $n$ being between 800 and 1000. $m$ indicates any integer up to an integer corresponding to the number of imino group in the polyalkylene imine. It is thus understood that not all the imino group in the polyalkylene imine need be substituted by the alkylene carbonate. The preferred agent, however, is the reaction product which has been obtained by reacting equimolecular amounts of the polyalkylene imine and the alkylene carbonate. During said reaction the temperature should not exceed about 50° C. because at higher temperature the alkylene carbonate dissociates into alkylene oxide and carbon dioxide. The preferred reaction temperature is between about 20° C. and about 50° C. The reaction requires several hours with stirring.

Such polyalkylene imine-alkylene carbonate reaction products are capable of retaining in solution otherwise insoluble metal oxides, hydroxides, carbonates, and other insoluble salts. They have the advantage over polyalkylene imines that they form soluble complex compounds with trivalent iron salts, aluminum chloride, copper sulfate, manganous chloride, cabaltous chloride, and others.

Other polyalkylene imine derivatives which are capable of forming soluble complex compounds with metals are the reaction products of polyalkylene imines with alkylene sulfites, for instance, of the formula

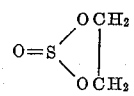

The process of producing metal complex compounds with polyalkylene imines or the reaction products of polyalkylene imines with cyclic alkylene carbonates or cyclic alkylene sulfites may find extensive application in many fields of the industry. For instance, this reaction may be used for softening water and preventing precipitation of calcium carbonate. It may also be used in the clarification of beverages, fruit juices, beer etc. in which it prevents the precipitation of insoluble calcium and the like salts. The polyalkylene imines and their above mentioned derivatives may also be used as sequestering agents or metal ion deactivators, for instance, as preservatives for concentrated solutions of hydrogen peroxide, whereby they serve to inactivate the cupric and ferric ions which catalyze the decomposition of hydrogen peroxide.

They may be used as masking agents in electroplating, as decontaminating agents for radioactive deposits, as agents for combining with traces of metals which cause discoloration in dyebaths, for removing iron and other metal stains on fabric, and in other applications where it is necessary to keep heavy metal ions in solution at a high pH-value.

They may be employed in the prevention of allergies due to metal ions and for stabilizing drugs which are unstable in the presence of metal ions. Other uses are, for instance, in the pickling of iron and other metals, whereby they have an inhibiting effect. They may be used in detergents and food products to prevent precipitation by metal ions and to inhibit or suppress undesirable reactions that are catalyzed by metal ions. They are also useful, for instance, as inhibitors in antifreeze solutions. The reaction products of polyalkylene imines with cyclic alkylene carbonates which may also be designated as alkylene glycol esters of a polycarbamic acid may even be used in aqueous solution as antifreeze agents.

Solutions containing the complex compound of iron with polyethylene imine may be used, for instance, as a cure for the yellow anemia of evergreens or other shrubs.

Another use of the metal complex compounds according to the present invention is, for instance, their use as synthetic enzymes. For instance, the complex compound obtained on reacting a cobalt salt with polyethylene imine or the reaction product of polyethylene imine with ethylene carbonate exhibits the activity of a phenol oxidase. Such metal complex compounds may be used for the enzymatic pulping of wood, i.e. for oxidizing the lignin which is a polymeric phenol ether. In place of the complex cobalt salt, a soluble titanium salt may also be used as metal component of the complex compound.

The following examples serve to illustrate the present invention without, however, limiting the same thereto.

EXAMPLE 1

*Preparation of the reaction product of polyethylene imine with ethylene carbonate*

100 cc. of a 10% aqueous polyethylene imine solution (0.23 mole) and 202 cc. of a 10% aqueous ethylene carbonate solution (0.23 mole) are mixed with each other and heated at 50° C. for 24 hours. The resulting solution of the reaction product is used as sequestering agent for the purposes mentioned hereinabove.

EXAMPLE 2

50 g. of 50% aqueous polyethylene imine solution (0.58 mole) and 51 g. of ethylene carbonate (0.58 mole) are mixed with each other. The mixture is stirred at a temperature between about 25° C. and about 32° C. until a sample of the mixture does not separate into two layers. Usually a homogeneous mixture is obtained after about four and a half hours. The resulting solution which contains about 25% of water is used as sequestering agent for the purposes mentioned hereinabove.

EXAMPLE 3

50 g. of a 50% aqueous solution of polyethylene imine (0.58 mole) and 59 g. of propylene carbonate (0.58 mole) are mixed with each other. The mixture is stirred at room temperature for 24 hours and then diluted with water to yield a solution containing 50% of solids, i.e. to 168 g. The resulting clear solution is used for the purposes indicated hereinabove.

The compounds obtained according to Examples 1 to 3 may be designated as polyethylene imine-ethylene glycol carbamates. Addition of such solutions to a molar ferric chloride solution until neutral, does not produce a precipitate of ferric hydroxide indicating that a complex compound is formed.

EXAMPLE 4

The solution prepared according to Example 1 is used to determine its sequestering effect upon various metal salt solution. In this test 5 cc. of the carbamate solution containing 0.004 mole are mixed with 4 cc. (0.004 mole), or less, of a molar salt solution. The following Table I shows the results obtained on such addition.

TABLE I

| Test No. | Carbamate solution, cc. | Metal Salt Solution | pH | Result |
|---|---|---|---|---|
| 1 | 5 | 4.0 cc. $FeCl_3.6H_2O$ | 2 | Clear red solution. |
| 2 | 5 | 2.0 cc. $FeCl_3.6H_2O$ | 3 | Do. |
| 3 | 5 | 1.0 cc. $FeCl_3.6H_2O$ | 4 | Do. |
| 4 | 5 | 0.2 cc. $FeCl_3.6H_2O$ | 8 | Clear yellow solution. |
| 5 | 5 | 4.0 cc. $AlCl_3.6H_2O$ | 4 | Clear opaque solution. |
| 6 | 5 | 0.5 cc. $AlCl_3.6H_2O$ | 5 | Do. |
| 7 | 5 | 0.2 cc. $AlCl_3.6H_2O$ | 5 | Do. |
| 8 | 5 | 4.0 cc. $CuSO_4.5H_2O$ | 6.5 | Precipitate. |
| 9 | 5 | 2.0 cc. $CuSO_4.5H_2O$ | 7.0 | Do. |
| 10 | 5 | 0.5 cc. $CuSO_4.5H_2O$ | 7.0 | Clear blue solution. |
| 11 | 5 | 4.0 cc. $MnCl_2.4H_2O$ | 6 | White precipitate. |
| 12 | 5 | 0.5 cc. $MnCl_2.4H_2O$ | 7 | White opaque solution. |
| 13 | 5 | 4.0 cc. $CoCl_2.6H_2O$ | 6.5 | Clear rose solution. |
| 14 | 5 | 0.5 cc. $CoCl_2.6H_2O$ | 7 | Clear dirty yellow solution. |
| 15 | 5 | 0.2 cc. $CoCl_2.6H_2O$ | 7 | Clear yellow solution |

EXAMPLE 5

The same tests as indicated in Table I are carried out with 5 cc. of an about 3% aqueous polyethylene imine solution. The polyethylene imine used in these tests is a polymerization product of ethylene imine of a degree of polymerization of about 900.

Table II shows the complex forming effect of polyethylene imine with metal salts.

TABLE II

| Test No. | Polyethylene imine, cc. | Metal Salt Solution | pH | Result |
|---|---|---|---|---|
| 1 | 5 | 4.0 cc. $FeCl_3.6H_2O$ | 2 | Clear red solution. |
| 2 | 5 | 2.0 cc. $FeCl_3.6H_2O$ | 3 | Do. |
| 3 | 5 | 1.0 cc. $FeCl_3.6H_2O$ | 7 | Heavy red precipitate. |
| 4 | 5 | 0.2 cc. $FeCl_3.6H_2O$ | 9 | Do. |
| 5 | 5 | 4.0 cc. $AlCl_3.6H_2O$ | 4 | Clear solution. |
| 6 | 5 | 0.5 cc. $AlCl_3.6H_2O$ | 7.5 | White gel. |
| 7 | 5 | 0.2 cc. $AlCl_3.6H_2O$ | 8.5 | Do. |
| 8 | 5 | 4.0 cc. $CuSO_4.5H_2O$ | 6.5 | Clear blue solution.* |
| 9 | 5 | 2.0 cc. $CuSO_4.5H_2O$ | 6.5 | Do.* |
| 10 | 5 | 0.5 cc. $CuSO_4.5H_2O$ | 7.5 | Do.* |
| 11 | 5 | 4.0 cc. $MnCl_2.4H_2O$ | 7 | Yellow precipitate. |
| 12 | 5 | 0.5 cc. $MnCl_2.4H_2O$ | 7.5 | Yellow solution. |
| 13 | 5 | 4.0 cc. $CoCl_2.6H_2O$ | 6.5 | Precipitate. |
| 14 | 5 | 0.5 cc. $CoCl_2.6H_2O$ | 7.5 | Clear. |
| 15 | 5 | 0.2 cc. $CoCl_2.6H_2O$ | 8.0 | Do. |

*Very little precipitate after 1 week standing.

The test results as given in Tables I and II show that the $Fe^{3+}$ ion is complexed by the carbamate compound to yield a solution while no such complexing takes place with polyethylene imine. On the contrary, polyethylene imine causes precipitation of ferric hydroxide at a pH of 7 and higher. Thus it is possible to prepare neutral and weakly acid solutions of the polyethylene imine-ethylene glycol carbamate which contain chelated $Fe^{3+}$ ions. Such solutions are useful, for instance, for catalytic reactions and enzymatic degradation of chemical products such as lignin.

The aluminum ion is complexed by the carbamate whereas aluminum hydroxide is precipitated by polyethylene imine. The carbamate compound thus permits production of neutral or slightly acid solutions containing $Al^{3+}$ ions.

The $Cu^{2+}$ ion is well complexed by the polyethylene imine, while the carbamate compound is not as suitable for complexing.

The $Mn^{2+}$ ion forms a white precipitate with the carbamate compound at a pH of 6.0 and a white or pink solution at a pH of 7.0 while polyethylene imine yields a yellow precipitate at a pH of 7.0 and a yellow solution at a pH of 7.5. This indicates that the carbamate compound has a higher protective power against oxidation than the polyethylene imine.

The $Co^{2+}$ ion is completely complexed by the carbamate compound. However, in weakly acidic medium it forms a precipitate with polyethylene imine.

Tests with zirconium salts show that the $Zr^{4+}$ ion is complexed by the carbamate compound. This proves that tetravalent metal ions are also capable of forming complex compounds with either the carbamate compound and/or the polyethylene imine.

The complex forming ability of the carbamate compound made according to the above given examples allows its use as additive to paper pulp in the manufacture of soft paper because it will solubilize the aluminum hydroxide as well as other metal hydroxides and thus cause their removal from the paper.

EXAMPLE 6

While polyethylene imine does not readily form complex compounds with $Fe^{3+}$ ions, it is a satisfactory complexing agent for $Fe^{2+}$ ions as will become evident from the following experiment.

100 cc., 200 cc., or, respectively, 300 cc. of an 0.1 molar ferrous sulfate solution corresponding to 0.01 mole, 0.02 mole, or, respectively 0.03 mole, are added to 50 cc. of a 10% polyethylene imine solution, i.e. to 5 g. of polyethylene imine corresponding to 0.116 mole. The molar ratio of polyethylene imine to ferrous hydroxide in the various solutions are 10:1; 10:2; and 10:3. The initially obtained precipitate redissolves readily and immediately and yields, as stated hereinabove, a yellow solution which subsequently changes its color to a greyish-green color.

It is, of course, understood that other metal ions than those mentioned hereinabove in the examples may be complexed by means of polyethylene imine or its ethylene glycol carbamate and that such solutions of the resulting complex metal compounds may find extensive application for many purposes.

I claim:

1. The water-soluble reaction product of a polyalkylene imine having from 800 to 3,000 polymeric units and the cyclic ester of a polyalcohol and carbonic acid having, within the polyalkylene imine chain, units of the formula:

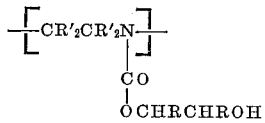

where R is selected from the class consisting of hydrogen, lower alkyl, and methylol; and R' is selected from the class consisting of hydrogen, alkyl, cycloalkyl, aryl, and aralkyl.

2. The reaction product of claim 1 wherein said polyalkylene imine is polyethylene imine.

3. The reaction product of claim 2 having units of the formula:

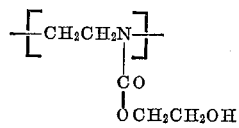

4. The reaction product of claim 2 having units of the formula:

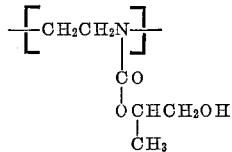

5. The reaction product of claim 2 having the approximate average formula:

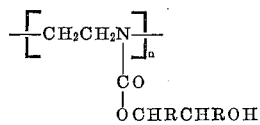

where $n$ is from 800 to 3000.

6. In a process of producing a water-soluble reaction product of a polyalkylene imine having a degree of polymerization between 800 and 3000 and the cyclic ester of a polyalcohol and carbonic acid, the steps which comprise mixing an aqueous solution of said polyalkylene imine with said cyclic ester, stirring the resulting mixture, and heating the stirred mixture at a temperature not exceeding 50° C. until a homogeneous solution, not separating into two layers on standing, is obtained.

7. The process of claim 6 wherein said polyalkylene imine is polyethylene imine and said cyclic ester is ethylene carbonate.

8. The process of claim 6 wherein said polyalkylene imine is polyethylene imine and said cyclic ester is propylene carbonate.

9. A sequestering agent for metallic ions comprising an aqueous solution of the reaction product of a polyalkylene imine having from 800 to 3,000 polymeric units and a cyclic ester of a polyalcohol and carbonic acid having, within the polyalkylene imine chain, units of the formula:

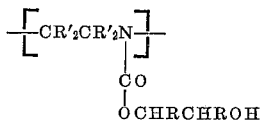

where R is selected from the class consisting of hydrogen, lower alkyl, and methylol, and R' is selected from the class consisting of hydrogen alkyl, cycloalkyl, aryl, and aralkyl.

10. The sequestering agent of claim 9 wherein said polyalkylene imine is polyethylene imine.

11. The sequestering agent of claim 10 wherein said cyclic ester is ethylene carbonate.

12. The sequestering agent of claim 10 wherein said cyclic ester is propylene carbonate.

References Cited

UNITED STATES PATENTS

| | | | |
|---|---|---|---|
| 2,824,857 | 2/1958 | Drechsel | 260—77.5 |
| 2,868,724 | 1/1959 | Zech | 210—58 |
| 2,897,162 | 7/1959 | Lowe et al. | 260—2 |
| 2,961,367 | 11/1960 | Weisgerber | 260—2 |
| 3,134,740 | 5/1964 | Sheetz | 260—2.1 |
| 3,150,081 | 9/1964 | Haslam | 210—58 |
| 3,162,618 | 12/1964 | Smith et al. | 260—77.5 |
| 3,264,368 | 8/1966 | Lane et al. | 260—2 |

MURRAY TILLMAN, *Primary Examiner.*

M. E. ROGERS, J. C. BLEUTGE, *Assistant Examiners.*